United States Patent
Ali

(10) Patent No.: US 8,755,446 B2
(45) Date of Patent: Jun. 17, 2014

(54) VARYING SHARPNESS BASED ON MOTION IN VIDEO SEQUENCES

(75) Inventor: Walid Ali, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 2016 days.

(21) Appl. No.: 11/121,483

(22) Filed: May 4, 2005

(65) Prior Publication Data
US 2006/0251170 A1 Nov. 9, 2006

(51) Int. Cl.
*H04N 7/12* (2006.01)

(52) U.S. Cl.
USPC .................................................. 375/240.29

(58) Field of Classification Search
USPC .......... 375/141, 240, 240.01, 240.12, 240.29; 348/625, 447; 382/261, 263, 266, 260, 382/270; 358/3.27; 347/251
See application file for complete search history.

(56) References Cited

U.S. PATENT DOCUMENTS

| | | | | |
|---|---|---|---|---|
| 5,081,692 A * | 1/1992 | Kwon et al. | | 382/263 |
| 5,426,666 A * | 6/1995 | Kato | | 375/141 |
| 5,465,119 A * | 11/1995 | Demos | | 348/447 |
| 5,757,977 A * | 5/1998 | Mancuso et al. | | 382/260 |
| 5,880,767 A * | 3/1999 | Liu | | 347/251 |
| 6,037,986 A * | 3/2000 | Zhang et al. | | 375/240.12 |
| 6,094,511 A * | 7/2000 | Metcalfe et al. | | 382/260 |
| 6,178,205 B1 * | 1/2001 | Cheung et al. | | 375/240.29 |
| 6,373,992 B1 * | 4/2002 | Nagao | | 382/266 |
| 6,600,518 B1 * | 7/2003 | Bakhmutsky et al. | | 348/625 |
| 6,628,842 B1 * | 9/2003 | Nagao | | 382/266 |
| 6,744,818 B2 * | 6/2004 | Sheraizin et al. | | 375/240.29 |
| 6,847,738 B1 * | 1/2005 | Scognamiglio et al. | | 382/260 |
| 7,031,393 B2 * | 4/2006 | Kondo et al. | | 375/240.29 |
| 7,072,525 B1 * | 7/2006 | Covell | | 382/261 |
| 7,088,474 B2 * | 8/2006 | Li et al. | | 358/3.27 |
| 7,095,903 B2 * | 8/2006 | Sheraizin et al. | | 382/270 |
| 7,362,810 B2 * | 4/2008 | Wang | | 375/240.29 |
| 2003/0081854 A1 * | 5/2003 | Deshpande | | 382/261 |

OTHER PUBLICATIONS

A. Murat Tekalp et al., "Identification of Image & Blur Parameters for the restoration of Noncausal Blurs" IEEE Transactions on Acoustics, Speech and Signal Processing vol. 34, No. 4, Aug. 1986, pp. 963-972.
Sung Cheol Park et al., "Super-resolution image reconstruction: a technical overview" IEEE Signal Processing Magazine, vol. 20, No. 3, May 2003, pp. 21-36.
Gerald Dehaan et al., 'Video processing for multimedia systems', ISBN 9090140158, May 2000, pp. 106-109.

* cited by examiner

*Primary Examiner* — Allen Wong
(74) *Attorney, Agent, or Firm* — Trop, Pruner & Hu, P.C.

(57) ABSTRACT

A method of sharpening video data may include, for at least some pixels in the video data, determining a motion value for a pixel. The sharpness of the pixel may be changed inversely in relation to the motion value of the pixel. Pixels that have higher velocities may be sharpened less than slower moving or stationary pixels in an image of video data.

15 Claims, 7 Drawing Sheets

VARYING SHARPNESS BASED ON MOTION IN VIDEO SEQUENCES

CROSS-REFERENCE TO RELATED APPLICATIONS

The present application is related to application Ser. No. 11/149,813, entitled "Enhancing Sharpness In Video Images" and filed on Jun. 10, 2005, and application Ser. No. 11/184,688, entitled "Enhancing Video Sequence Sharpness By Adaptive Peaking" and filed on Jul. 19,2005.

BACKGROUND

Implementations of the claimed invention generally may relate to schemes for enhancing video information and, more particularly, to such schemes that alter the sharpness of the video information.

Video information may be transmitted via a medium in time and/or space for viewing at a separate time and/or location. In some cases, the medium may be a transmission medium, such as carrier waves (e.g., terrestrial and/or cable-carried) or protocol-based data networks. In some cases, the medium may be a storage medium (e.g., tape, hard disk, digital video disc (DVD), etc.) that may store the video information prior to its display. Typically, the video data may be encoded into one of a number of formats before transmission. Some encoding formats may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

Such encoding of video information may remove (e.g., by quantizing, etc.) some higher-frequency content in the original video information. The decoded information may appear smoothed and/or somewhat fuzzy when displayed. This phenomenon may not be unique to encoded video data, but may also be present in, for example, transmitted analog video due to impediments in the transmission path. Thus, it may be desirable to increase the sharpness of received and/or decoded video data to improve its perceived picture quality.

To further introduce the concept of sharpening video, a one-dimensional example will be discussed with regard to FIGS. 1A and 1B. An image in a video sequence may include, for example, luma and chroma signals (e.g., Y, U, and V) sampled in both the horizontal and vertical directions. When the image is roughly uniform in a certain area, the sample values may be substantially the same. When an edge (e.g. a horizontal edge) exists in the image, however, the sample values in the horizontal direction may undergo an abrupt change in value. FIG. 1A illustrates a one-dimensional plot 110 of luma values that change somewhat abruptly over a number of pixels.

To sharpen the video signal, overshoots/undershoots may be generated in the signal (e.g., Y, U or V) by adding the second derivative (e.g., $d^2Y/dx^2$) of plot 110 to itself. FIG. 1B illustrates a plot 120 that has been so sharpened by the addition of undershoot 130 and overshoot 140. Adding overshoot/undershoot 140/130 may boost perceived, higher frequency components. Because plot 120 may have steeper edges than plot 110, its transition may be perceived as visually sharper than that of unsharpened plot 110.

Some schemes for increasing the sharpness of video information, however, may also increase noise within the video information to unacceptable levels.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIGS. 1A and 1B conceptually illustrate sharpening a video signal.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1A:
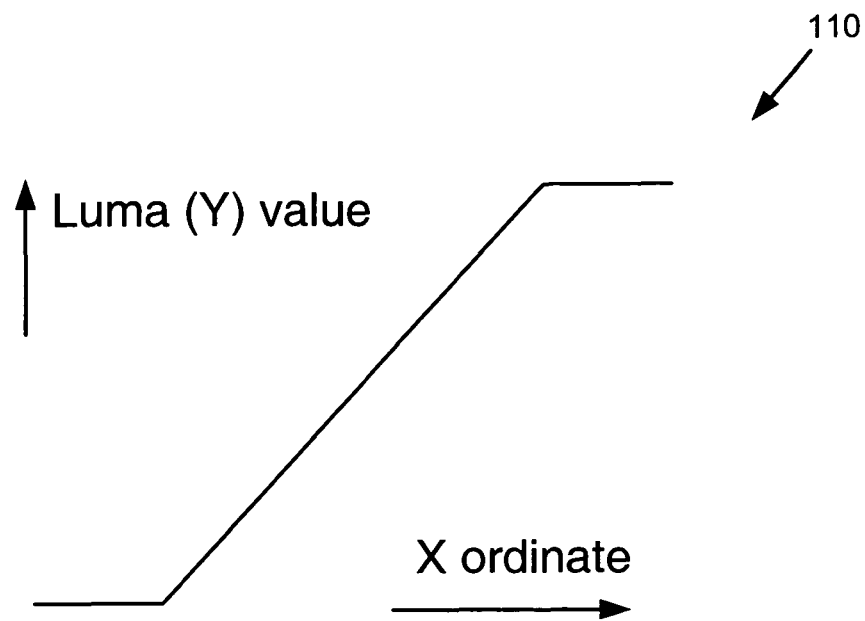
Figure 1B:
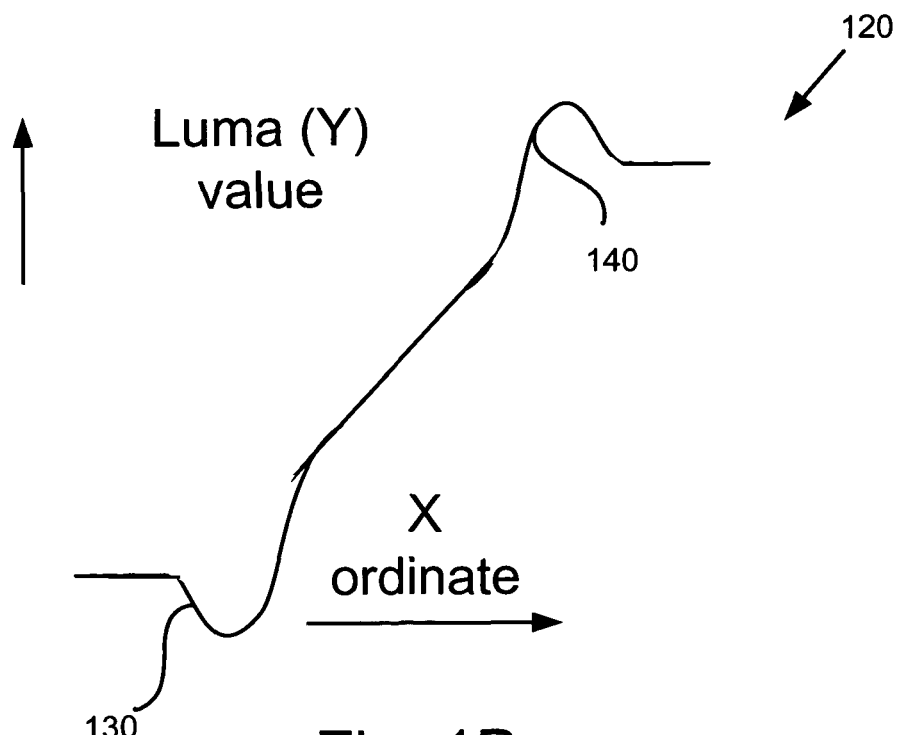
Figure 2:
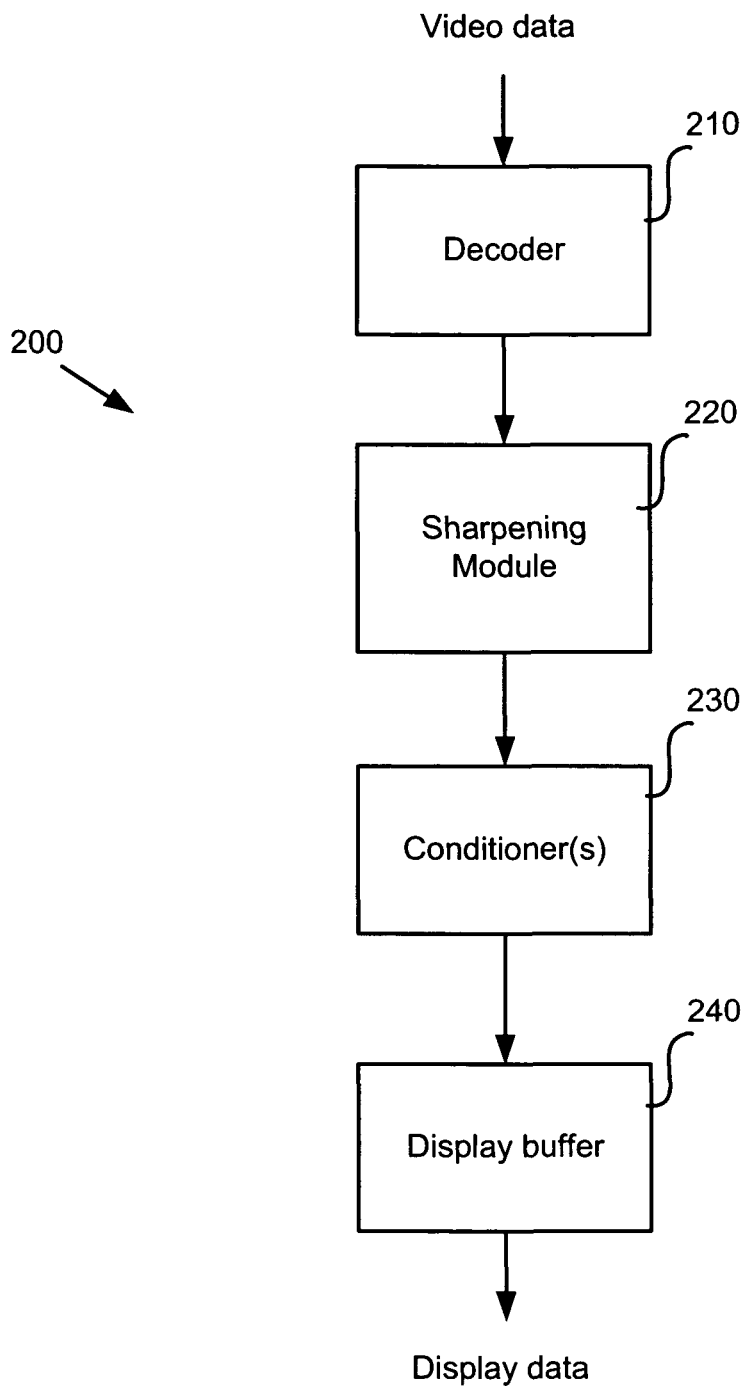
FIG. 2 illustrates a portion of a video display system.

FIG. 2 illustrates a portion of a video display system 200. System 200 may receive video information from any suitable medium, including but not limited to various transmission and/or storage media. Although illustrated as separate functional elements for ease of explanation, any or all of the elements of system 200 may be co-located and/or implemented by a common group of gates and/or transistors. Further, system 200 may be implemented via software, firmware, hardware, or any suitable combination thereof.

The portion of display system 200 shown in FIG. 2 may include a decoder 210, a sharpening module 220, one or more signal conditioner(s) 230, and a display buffer 240. Decoder 210 may, in some implementations, decode encoded video data to produce a stream of video data for further processing. Decoder 210 may decode data encoded in a number of schemes that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1. In some implementations, where decoder 210 decodes based on motion vectors in the video data, it may forward some of these motion vectors to sharpening module 220.

In some implementations, decoder 210 may include a demodulator, for example for received analog video. Such a demodulator may perform a similar function to a digital decoder by extracting a stream of video from a received, modulated signal. In other implementations, decoder 210 may include any other such circuitry and functionality desirable to extract a stream of video that is usable by sharpening module.

Sharpening module 220 may function to selectively sharpen the stream of video from decoder 220. In some implementations, sharpening module 220 may differently sharpen certain portions of a picture in the video stream based on the motion of these portions. Because the human visual system is more sensitive to details in static sharpness and is less sensitive to details in moving objects, sharpening module 220 may sharpen static portions of the picture to a greater extent than moving portions of the picture. Such selective sharpening based on motion may produce a greater perceived visual depth in the sharpened video.

Figure 3:
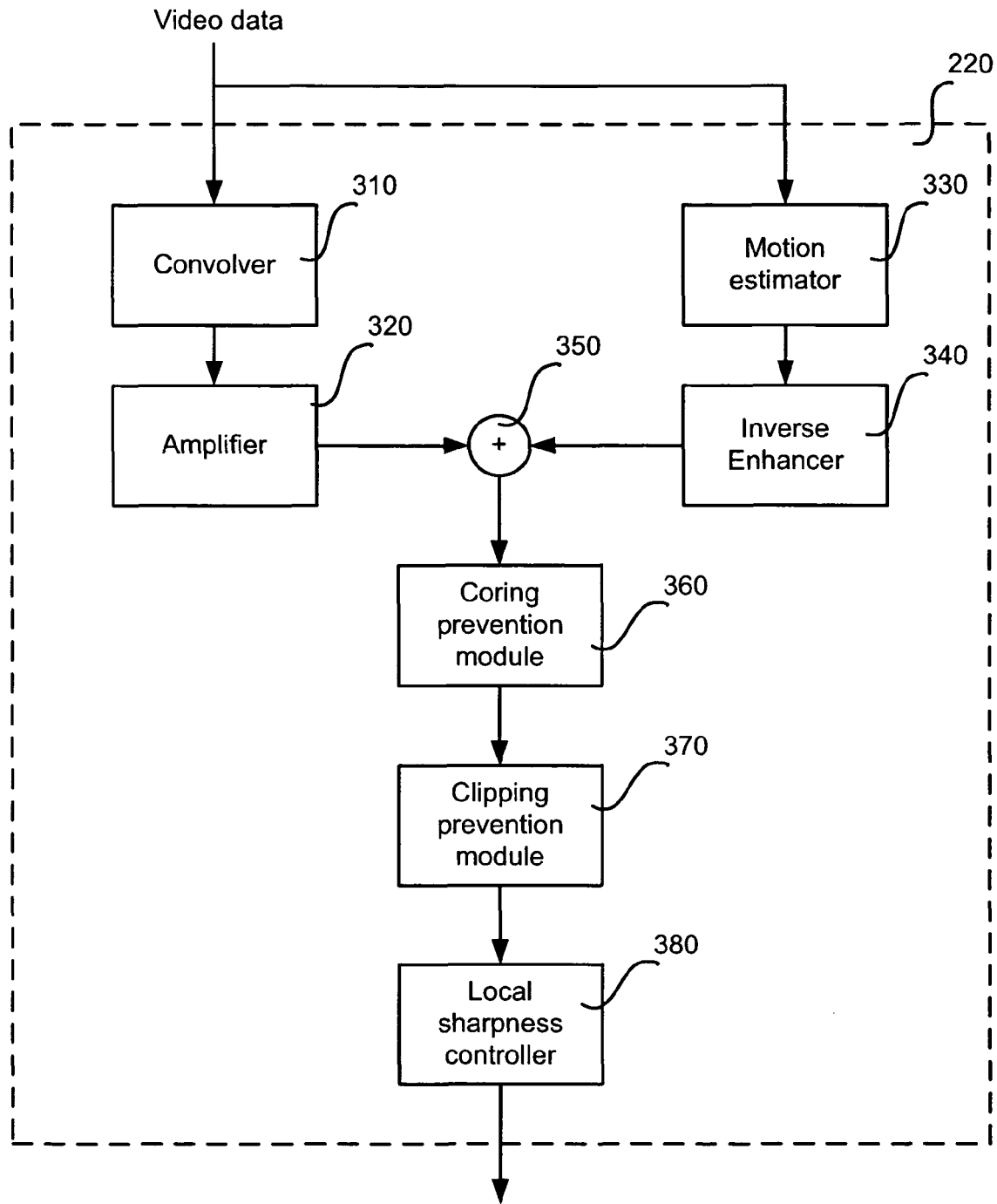
FIG. 3 illustrates an exemplary sharpening module in the system of FIG. 2.

FIG. 3 illustrates an implementation of sharpening module 220. Sharpening module 220 may include a convolver 310, an amplifier 320, a motion estimator 330, an inverse enhancer 340, a combiner 350, a coring prevention module 360, a clipping prevention module 370, and a local sharpness controller 380. Although illustrated as being connected in a certain manner for ease of illustration, sharpening module 220 in FIG. 3 may be connected in other configurations. For example, inverse enhancer 340 may be connected as a control input to amplifier 320, instead of to combiner 350 as shown. Other variations are both possible and contemplated.

Convolver 310 may be arranged to sharpen a pixel (e.g., Y, U, and/or V component) of video data by adding content to the pixel. Convolver 310 may convolve a two-dimensional (2D) Laplacian kernel with a number of pixels surrounding the pixel in question to obtain a derivative value. Convolver 310 may add this derivative value to the pixel in question to produce a sharpened pixel value.

Figures 4, 5:
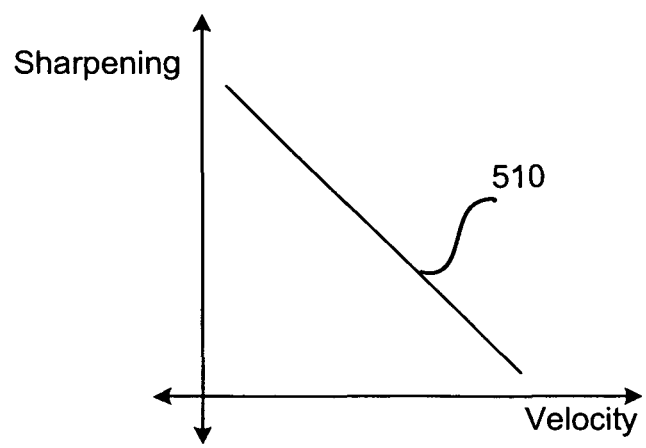
FIG. 4 conceptually illustrates an example convolution kernel.
FIG. 5 illustrates a plot of peaking verses velocity.

For example, in some implementations, convolver 310 may use a 5×5 kernel, such as Laplacian convolution kernel 410 shown in FIG. 4. Convolver 310 may convolve kernel 410 with, for example, the 5×5 luma data containing the pixel in question to obtain the 2D derivative of the luma signal. Such derivative may be added to the luma pixel in question to obtain the sharpened pixel value. Other variations than this specific example are contemplated. For example, a different-sized kernel may be used by convolver 310. In some implementations, the same or different kernels may be used for luma (e.g., Y) and chroma (e.g., U and/or V) video data. In some implementations, only the luma data may be convolved, while passing the chroma data unaltered.

Amplifier 320 may be arranged to increase the sharpened pixel value from convolver 310. In some implementations, amplifier 320 may amplify the sharpened pixel values by an amount around 15% of the energy of kernel 410 to produce an amplified pixel value. Other gain values are possible for amplifier 320, however. In some implementations, amplifier 320 may only supply gain-to those pixel values that exceed around 5% (or another relatively small threshold) of the overall dynamic range of the sharpened pixel values. Such selective amplification by amplifier 320 may avoid amplifying noise below a certain signal level. Amplifier 320 may output amplified pixel values to combiner 350.

Motion estimator 330 may be arranged to estimate motion values for pixels in the incoming video stream. For example, motion vectors may be estimated by motion estimator 330 for a current picture in a video stream from the previous two or three pictures. The magnitude (e.g., velocity) of the estimated motion vectors at any pixel may be calculated as the square root of the squared motion vectors at any point (x, y) in the image.

$$v(x, y)v = \sqrt[2]{(v_x^2 + v_y^2)}$$

Motion estimator 330 may produce a motion value for a given pixel, such as the particular pixel undergoing sharpening by convolver 310.

In some implementations, motion estimator 330 may not estimate motion vectors for a given video stream, but instead may re-use the motion vectors from earlier processing, such as from decoder 210. In such implementations, motion estimator 330 may utilize motion vectors from elsewhere in system 200 to aid in determining the velocity of a given pixel (e.g., one that is being processed by convolver 210 and amplifier 220.

Inverse enhancer 340 may produce an enhancement value for a pixel that varies roughly inversely with the velocity value from motion estimator 330. FIG. 5 illustrates an example plot 510 of a sharpening, or peaking, function verses velocity that may be implemented by inverse enhancer 340. As illustrated in FIG. 5, when the velocity of a pixel is relatively high, inverse enhancer 340 may generate a relatively small enhancement value. Conversely, when the velocity of a pixel is relatively low, inverse enhancer 340 may generate a relatively large enhancement value. Thus, inverse enhancer 340 may cause pixels with little motion to be sharpened more than those with greater motion.

Although plot 510 shows a roughly linear, monotonically decreasing function, inverse enhancer 340 may inversely enhance sharpness in other ways. For example, in some implementations plot 510 may be curvilinear. In some implementations, plot 510 may be generally decreasing overall, but need not necessarily be monotonic. Typically, inverse enhancer 340 may adjust the sharpness of a pixel with some inverse relationship to its velocity. In performing such enhancement, inverse enhancer 340 may, in some implementations, calculate the enhancement value using a mathematical function and the motion value as an input to the function. In some implementations, however, inverse enhancer 340 may provide the enhancement value using, for example, a look-up table (or other suitable data structure) or another scheme that does not involve mathematical calculation.

Retuning to FIG. 3, combiner 350 may combine the amplified pixel values from amplifier 320 with the enhancement values from inverse enhancer 340 to output enhanced pixel values. In some implementations, combiner 350 may include an adder to add an amplified pixel values to a corresponding enhancement value. In some implementations, combiner 350 may include other logic to arithmetically (e.g., substracter, multiplier, etc.) and/or logically (e.g., AND, XOR, etc.) combine an amplified pixel values to a corresponding enhancement value as appropriate. The resulting enhanced pixel values may be operated on by up to three of elements 360-390.

Although elements 360-390 may all be present in some implementations, in other implementations these elements may be optional, either singly or in a group. For example, in some implementations, none of elements 360-390 may be present, and the enhanced pixel values from combiner 350 may be output from sharpening module 220. In some implementations, one or more of elements 360-390 may be omitted, while one or more of elements 360-390 may operate on the enhanced pixel values from combiner 350.

Coring prevention module 360 may be arranged to prevent "coring" due to the presence of image noise. Such noise may produce a relatively small value at, for example, the output of convolver 310 that may be apparent in the enhanced pixel value from combiner 350. Coring prevention module 360 may act to reduce and/or eliminate certain small input values. Purely by way of example, if the enhanced pixel value is less than about ±10 (e.g., out of a full-scale range of about ±250), then coring prevention module 360 may set the enhanced pixel value to 0. For enhanced pixel values that fall outside this small range, coring prevention module 360 may pass them substantially unaltered.

Figure 6A:
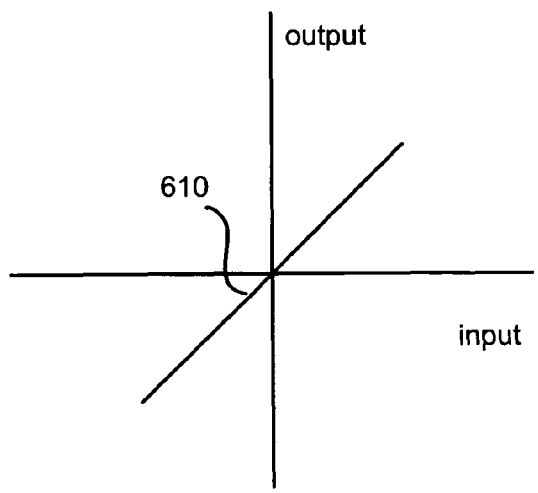
FIGS. 6A-6C illustrate exemplary transfer functions.
Figure 6B:
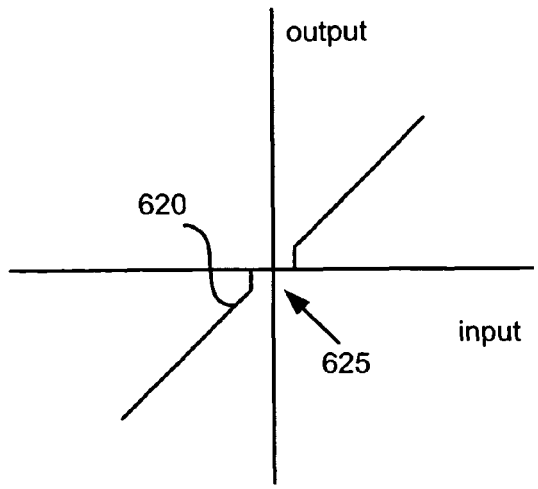

The operation of coring prevention module 360 will be further described with regard to FIGS. 6A and 6B. As a starting point of reference, plot 610 in FIG. 6A represents a transfer function without module 360 present. In other words, plot 610 may be conceptualized as a transfer function of unity. The output reflects the input in plot 610. By contrast, plot 620 in FIG. 6B represents a transfer function with module 360 present. As may be seen in FIG. 6B at 625, when the input to module 360 is less than a certain amount, module 360 may output zero. Otherwise, module 360 may pass the input, enhanced pixel value without alteration.

Clipping prevention module 370 may be arranged to prevent "clipping" due to high levels of output. Such high levels may produce Moire (e.g., aliasing) effects in the final, viewed video signal. Clipping prevention module 370 may act to limit certain large input values to a ceiling value. Purely by way of example, if the enhanced pixel value input to clipping prevention module 370 is greater than about ±240 (e.g., out of a full-scale range of about ±250), then coring prevention module 360 may set the enhanced pixel value to a ceiling value of around 240. For enhanced pixel values that fall outside this higher range, clipping prevention module 370 may pass them substantially unaltered.

Figure 6C:
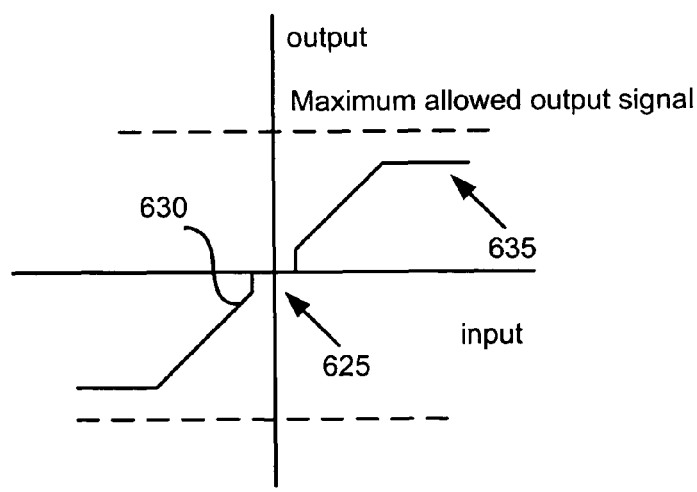

The operation of clipping prevention module 370 will be further described with regard to FIGS. 6B and 6C. Plot 630 in FIG. 6C represents a transfer function with modules 360 and 370 present. In addition to the effect 625 of module 360, when the input to clipping prevention module 370 is greater than a certain ceiling value 635, module 370 outputs ceiling value 635. Ceiling value 635 may approach, but may be less than, a maximum allowed output value (illustrated as a dashed line) to avoid clipping. For smaller input values, clipping prevention module 370 may pass the input, enhanced pixel value without alteration.

Local sharpness controller 380 may be arranged to disable sharpening if the area around the pixel in question is generally smooth. Various implementations are possible for this local control function. For example, although not explicitly shown in FIG. 3, controller 380 may be connected to one or more of convolver 310 and amplifier 320 to disable their operation if surrounding pixels vary less than a certain amount from the pixel in question (e.g., currently processed pixel). In some implementations, the original pixel value input to convolver 310 may be carried along with the enhanced pixel value, and such may be substituted for the enhanced pixel value by local sharpness controller 380. Other implementations are both possible and contemplated.

Returning to FIG. 2, sharpening module 220 may output enhanced pixel values to one or more conditioner(s) 230 that may further condition the pixels. Conditioner(s) 230 may include, for example, one or more of deinterlacing, noise reduction, scaling, and/or other signal conditioning functionality. Conditioner(s) 230 may be implemented via dedicated hardware, firmware, software, or some combination thereof to perform one or more signal conditioning functions after the sharpening performed by sharpening module 220.

Display buffer 240 may receive video data from conditioner(s) 230, and may temporarily store at least some of such data prior to its output to a display device (not shown). In addition to a buffering (e.g., storage) function, display buffer 240 may perform other display-related tasks, such as synchronizing its output signal to a timing or sync signal to facilitate display. Other functionality that is typically found in display buffers may also be present in display buffer 240.

Figure 7:
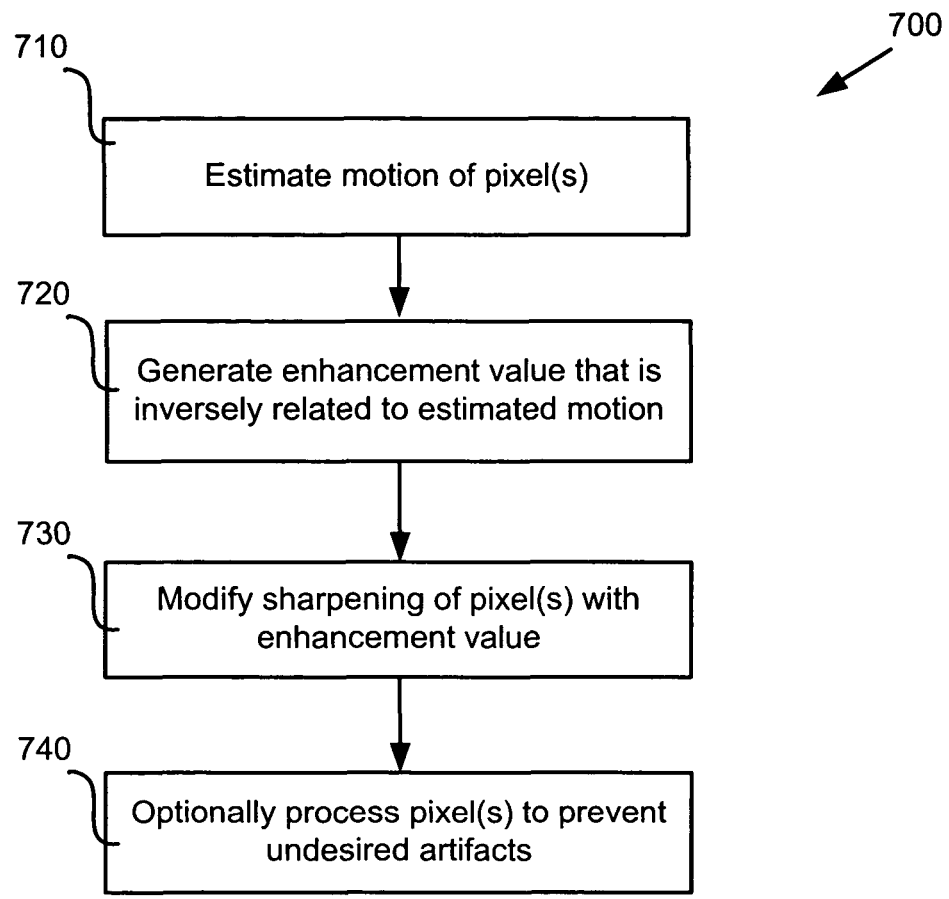
FIG. 7 illustrates an exemplary process of changing the sharpness of video data based on motion.

FIG. 7 illustrates an example process 700 of changing the sharpness of video data based on motion. Although FIG. 7 may be described with regard to sharpening module 220 in FIGS. 2 and 3 for ease and clarity of explanation, it should be understood that process 700 may be performed by other hardware and/or software implementations.

Processing may begin by estimating the motion of one or more pixels in s stream of video data [act 710]. The pixel(s) may, for example, be those currently undergoing sharpening by hardware such as convolver 310. In some implementations, the motion of a pixel may be estimated via motion estimator 330 based on one or more of its associated x-direction and y-direction motion vectors. One possible metric of motion for a pixel may be the amplitude of its velocity vector, although other motion metrics may be used if desired.

Processing may continue by generating an enhancement value that is inversely related to the estimated motion [act 720]. In some implementations, enhancer 340 may generate an enhancement value that is relatively small if the motion value is relatively large and that is relatively large if the motion value is relatively small. Enhancer 340, or whatever mechanism performs act 720, may in some implementations apply a mathematical function to the motion value produced in act 710. Such function may be, for example, linear, curvilinear, monotonic, non-monotonic but generally decreasing, etc.

The pixel(s) in question may be modified with the enhancement value to produce pixels that are sharpened inversely relative to their motion [act 730]. In some implementations, combiner 350 may add the enhancement value to a previously sharpened pixel value (e.g., by convolver 310 and/or amplifier 320). Whatever the particular details of implementation, however, act 730 may produce pixels that have been sharpened to a greater degree when they have little or no motion, and pixels than are sharpened to a lesser degree when they have a greater amount of motion.

Although acts 720 and 730 (and enhancer 340) above refer to "inverse" enhancement, it should be noted that such enhancement may also be performed directly or proportionately. For example, the pixels in question may be enhanced directly/proportionately to their motion (e.g., greater enhancement for greater motion, and less enhancement for less motion), and the resulting value may be subtracted from the output of amplifier 320 by combiner 350. Such a scheme would also impart greater sharpness to slowly moving pixels and less to faster moving pixels. Hence, acts 720 and 730 (and enhancer 340) both contemplate and may include such an alternate scheme.

Optionally, the pixel(s) thus differently sharpened may be further processed to prevent undesired artifacts [act 740]. In some implementations, such further processing may be performed by one or more of modules 360-380. In such cases, such artifacts as coring, clipping, etc., may be reduced or avoided. Acts 710-740 may be repeated on a pixel-by-pixel basis (e.g., luma and/or chroma components of each pixel), or for groups of pixels within an image. In the latter implementation, the same of similar sharpening may be applied to all pixels in a given group.

Figure 8:
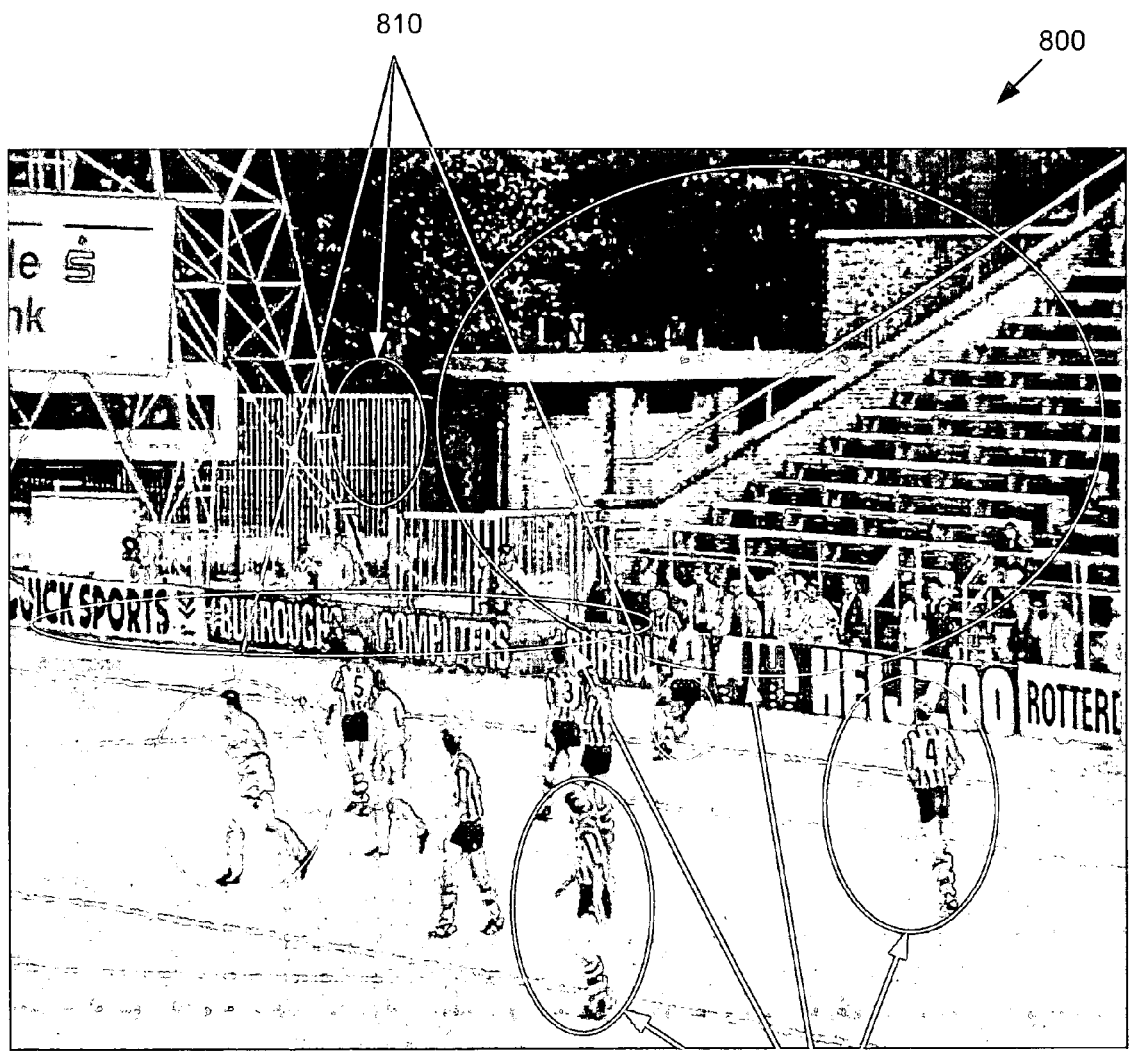
FIG. 8 illustrates an example image illustrating different areas of greater and lesser sharpening.

FIG. 8 illustrates an example image 800 illustrating different areas of greater and lesser sharpening based on their respective motion amounts. Areas 810 may be sharpened less due to their greater motion. For example, pixels defining the soccer player at the left of the image and the one at the right with the ball may be moving relatively fast in the video stream. Similarly, the closely-spaced vertical fence bars in the remaining are 810 may also have a higher motion due to camera panning. Thus, due to the operation of, for example, inverse enhancer 340, areas 810 may be sharpened less than areas 820.

Areas 820 may be sharpened more than areas 810 due to the lesser motion of areas 820. For example, pixels defining the two players toward the bottom of the image may be moving relatively slowly in the video stream. So may pixels defining the crowd, bleachers, and advertising signs lining the field. Consistent with acts 720 and 730, for example, these slow-moving areas 820 may be sharpened more than areas 810.

Although only two types of areas 810 and 820 are shown in FIG. 8 for ease of explanation, this should not be taken as a suggestion that only two differing sharpnesses may be present in an image. In some implementations, for example, each of the ovals may be sharpened by a different degree. In some implementations, pixels within a given oval may be sharpened to different degrees based on their relative motions. FIG. 8 is intended purely as an example to illustrate different sharpening within video data based on motion. Such differential sharpening may lend a greater perceived depth to a stream of video data, which may be desirable in some cases.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, the motion of a pixel need not necessarily be the aggregate of x-direction and y-direction velocities as shown above in paragraph 0025. Rather, in some implementations, a different combination (e.g., average, mean, etc.) of x and y velocities may be used. In some implementations, to reduce computation, one of the x and y velocities may be used (e.g., the larger of the two) for a given pixel.

Also, although the scheme described herein may be performed on a pixel-by-pixel basis, it may also be performed for aggregations or groups of pixels in an image. Moreover, although an inverse relationship between motion and sharpness has been described, any manner of adjusting sharpness of video based on motion within the video may be practiced consistent with the principles of the invention. The relationship between motion and sharpness need not necessarily be inverse. Rather, the sharpness of different pixels in an image may be differently adjusted from each other based on their respective motion.

Further, the acts in FIG. 7 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   electronically sharpening a portion of a decoded frame as an inverse mathematical function of the velocity of estimated motion vectors of pixels of the portion, so that pixels with higher velocities are sharpened less than pixels with lower velocities;
   decoding a video frame;
   determining a first motion value for one or more first pixels in said decoded frame;
   modifying a sharpness of the one or more decoded first pixels by a first amount based on the first motion value;
   determining a second motion value that is different from the first motion value for one or more different pixels in the decoded frame; and
   modifying a sharpness of the one or more different pixels by a second amount that is different from the first amount and that is based on the second motion value.

2. The method of claim 1, wherein the first motion value is greater than the second motion value, and
   wherein the first amount is less than the second amount.

3. The method of claim 1, wherein the first motion value is less than the second motion value, and
   wherein the first amount is greater than the second amount.

4. The method of claim 1, further comprising:
   calculating the first amount by applying the first motion value to a decreasing function; and
   calculating the second amount by applying the second motion value to the decreasing function.

5. The method of claim 1, further comprising:
   obtaining the first amount from a table using the first motion value; and
   obtaining the second amount from the table using the second motion value.

6. The method of claim 1, further comprising:
   preventing coring by zeroing pixel values that fall below a coring threshold.

7. The method of claim 1, further comprising:
   preventing clipping by limiting pixel values that fall above a clipping threshold to a value of the clipping threshold.

8. A system comprising:
   a processor to sharpen a portion of a decoded frame as an inverse mathematical function of the velocity of estimated motion vectors of pixels of the portion, so that pixels with higher velocities are sharpened less than pixels with lower velocities;
   a sharpening portion to sharpen a pixel of video data in a decoded frame and output a sharpened pixel value;
   a motion estimator to produce a motion value associated with the pixel of video data;
   an enhancer to generate an enhancement value based on the motion value;
   a combiner to combine the sharpened pixel value and the enhancement value and to output an enhanced pixel value; and
   a storage coupled to said processor.

9. The system of claim 8, wherein the sharpening portion includes:
   a convolver to convolve the pixel and a number of surrounding pixels with similarly sized kernel.

10. The system of claim 9, wherein the sharpening portion further includes:
    an amplifier to amplify an output of the convolver to generate the sharpened pixel value.

11. The system of claim 8, wherein the enhancer is arranged to generate the enhancement value with an inversely proportional relationship to the motion value, and wherein the combiner is arranged to add the sharpened pixel value and the enhancement value.

12. The system of claim 8, further comprising:
a coring prevention module coupled to an output of the combiner to change enhanced pixel values that are less than a coring threshold to zero.

13. The system of claim 8, further comprising:
a coring prevention module coupled to an output of the combiner to limit enhanced pixel values that are greater than a clipping threshold to a value of the clipping threshold.

14. The system of claim 8, further comprising:
a deinterlacing module, a noise reduction module, or a scaling module operatively coupled to an output of the combiner to further condition the sharpened pixel value.

15. The system of claim 8, further comprising:
a display buffer operatively coupled to an output of the combiner to buffer sharpened pixel values before display.

* * * * *